United States Patent
Adam

(10) Patent No.: US 6,631,878 B1
(45) Date of Patent: Oct. 14, 2003

(54) ADJUSTABLE BASE SUPPORT MOUNT FOR HVAC EQUIPMENT

(75) Inventor: Courtney Adam, Elk Point, SD (US)

(73) Assignee: Bramec Corporation, North Sioux City, SD (US)

( * ) Notice: Subject to any disclaimer, the term of this patent is extended or adjusted under 35 U.S.C. 154(b) by 0 days.

(21) Appl. No.: 09/704,682

(22) Filed: Nov. 3, 2000

(51) Int. Cl.[7] .............................................. F16M 11/24
(52) U.S. Cl. .................................. 248/188.4; 248/354.4
(58) Field of Search ........................... 248/188.4, 188.2, 248/188.5, 650, 680, 157, 384.3, 384.4, 616, 384.5; 411/180, 986; 52/126.6, 302.1

(56) References Cited

U.S. PATENT DOCUMENTS

| | | | |
|---|---|---|---|
| 287,913 A | | 11/1883 | Dawson et al. |
| 482,553 A | * | 9/1892 | Fuhrman ...................... 248/405 |
| 591,053 A | | 10/1897 | Nicholson |
| 911,893 A | * | 2/1909 | Massey ....................... 248/618 |
| 1,118,974 A | | 12/1914 | Ulrich et al. |
| 2,099,450 A | | 11/1937 | Meyer |
| 2,941,766 A | * | 6/1960 | Ranst ....................... 267/141.7 |
| 3,041,777 A | * | 7/1962 | Schwartz .................. 248/188.4 |
| 3,313,505 A | * | 4/1967 | Petrie ........................... 248/165 |
| 3,722,565 A | * | 3/1973 | Miller, Jr. et al. ....... 411/180 X |
| 4,183,495 A | | 1/1980 | Adam et al. |
| 5,116,004 A | * | 5/1992 | Luecke ................. 248/188.4 X |
| 5,131,621 A | | 7/1992 | Sdano |
| 5,205,690 A | * | 4/1993 | Roth ........................... 411/180 |
| 5,588,264 A | | 12/1996 | Buzon |
| 5,833,206 A | * | 11/1998 | Peacock .............. 248/188.5 X |
| 6,024,330 A | * | 2/2000 | Mroz et al. .............. 248/188.4 |
| 6,029,942 A | | 2/2000 | Daddis, Jr. et al. |
| 6,095,463 A | * | 8/2000 | McCormick ............. 248/188.4 |
| 6,135,401 A | * | 10/2000 | Chen ........................ 248/188.5 |
| 6,505,803 B1 | * | 1/2003 | Hernandez ............... 248/354.5 |

* cited by examiner

Primary Examiner—Ramon O. Ramirez
Assistant Examiner—Tan Le
(74) Attorney, Agent, or Firm—Shlesinger, Arkwright & Garvey LLP

(57) ABSTRACT

Base support mount for HVAC equipment, comprises a base including a cavity having an outer edge; a body received within the cavity, the body including outside threads, and including a portion to support the equipment in a spaced relationship from a horizontal surface; and a nut engaging the outside threads and the outer edge, the nut being effective to raise or lower the body relative to the base when the nut is turned clockwise or counterclockwise, respectively.

16 Claims, 3 Drawing Sheets

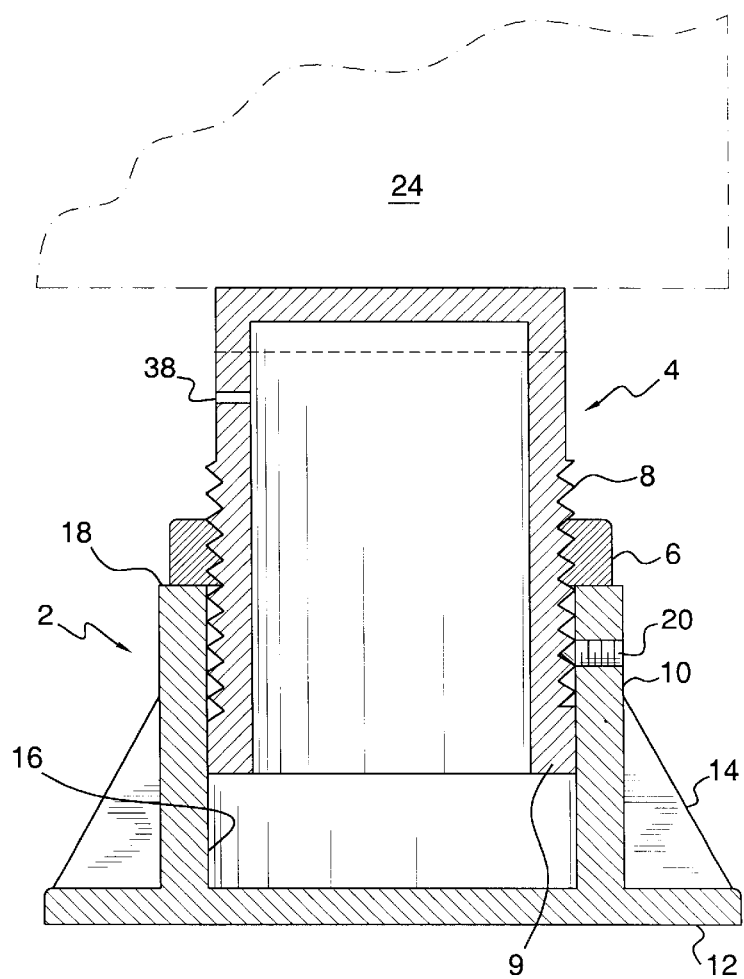
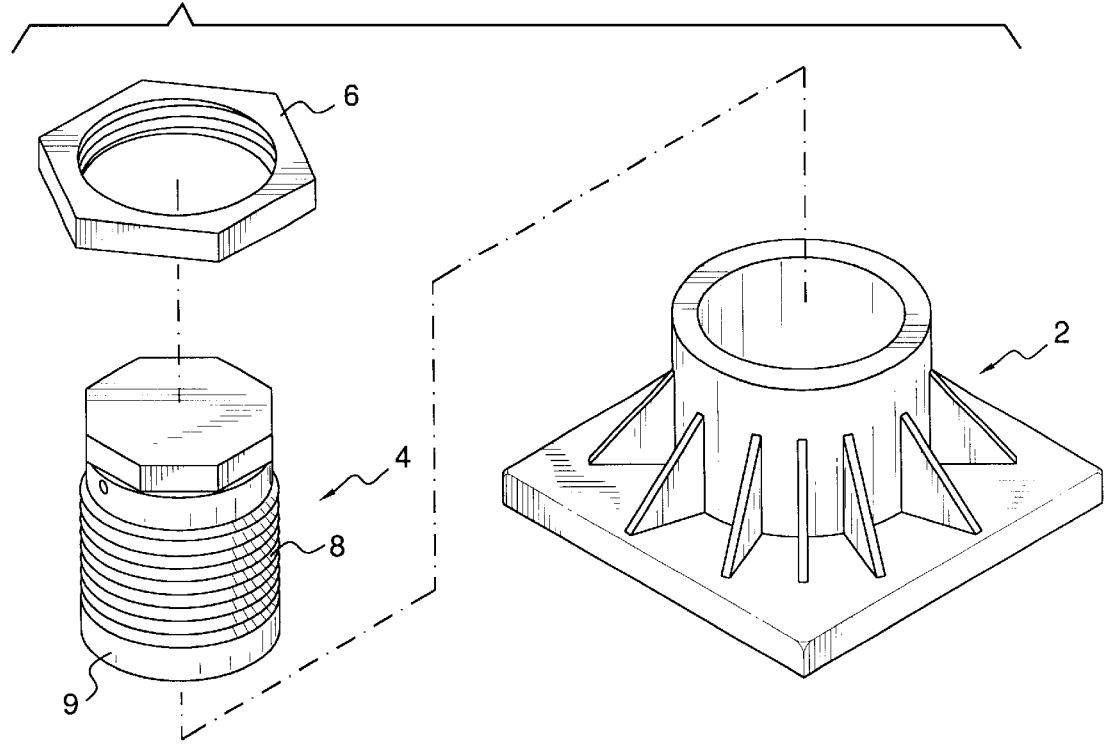

ADJUSTABLE BASE SUPPORT MOUNT FOR HVAC EQUIPMENT

FIELD OF THE INVENTION

The present invention relates generally to base support mounts for HVAC equipment.

BACKGROUND OF THE INVENTION

A HVAC equipment is typically installed in a spaced relationship from the ground, building structure or pad. Although the equipment is initially installed level, over time the underlying structure would settle unevenly, resulting in the equipment being out of level. To realign the equipment would involve reinstalling the equipment or shoring up the underlying structure to make it level again.

The present invention solves the above problem by providing an equipment mount that can be conveniently adjusted in height to compensate for the uneven underlying ground, building structure or pad supporting the equipment.

OBJECTS AND SUMMARY OF THE INVENTION

It is an object of the present invention to provide a base support mount for HVAC equipment that can be adjusted in height to account for an uneven support pad or to be able to re-adjust the mounts to account for an uneven settling of the equipment pad or underlying support structure.

In summary, the present invention provides a base support mount for HVAC equipment, comprising a base including a cavity having an outer edge; a body received within the cavity, the body including outside threads, and including a portion to support the equipment in a spaced relationship from a horizontal surface; and a nut engaging the outside threads and the outer edge, the nut being effective to raise or lower the body relative to the base when the nut is turned clockwise or counterclockwise, respectively.

These and other objects of the present invention will become apparent from the following detailed description.

BRIEF DESCRIPTIONS OF THE DRAWINGS

FIG. 2 is a cross-sectional view taken along line 2—2 of FIG. 1.

FIG. 3 is an assembly view of FIG. 1.

DETAILED DESCRIPTION OF THE INVENTION

Figure 1:
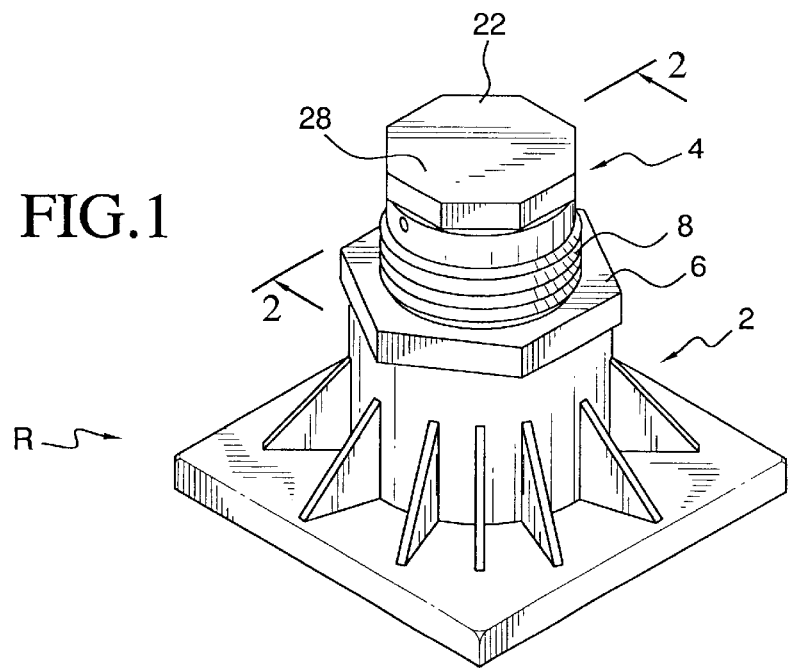
FIG. 1 is a perspective view of a base support mount made in accordance with the present invention.

A base support mount R made in accordance with the present invention is disclosed in FIG. 1. The mount R includes a base 2 and a body 4 receivable within the base 2. A nut 6 cooperates with outside threads 8 disposed on the body 4. Turning the nut 6 clockwise or counterclockwise relative to the base 2 and the body 4 is effective to raise or lower the body 4 relative to the base 2. The body 4 includes an unthreaded bottom portion 9 that would prevent the nut 6 from unscrewing all the way through the body at the bottom portion.

The base 2 includes a sleeve portion 10 and a flange portion 12. A plurality of gussets 14 provide reinforcement for the overall structure of the base 2.

The base 2 includes a cavity 16 adapted to receive the body 4. The cavity 16 is preferably cylindrical. The body 4 includes an upper edge 18 that acts as a bearing surface to support the nut 6 and the weight of the equipment bearing on the body 4. A set screw 20 is disposed through a threaded opening in the sleeve portion 10 to provide the means for locking the body 4 in position after it has been adjusted to its desired height by the nut 6.

The body 4 includes a top portion 22 used to support a HVAC equipment 24, such as an air conditioning unit. The top portion 22 is preferably octagonal in shape to permit use of a wrench to hold the body 4 steady while the nut 6 is turned.

The equipment 24 may be supported on a plurality of mounts R by engaging an understructure or other structure of the equipment. The base support mounts R are disposed on an equipment pad 26, typically made of concrete, or some other stable support surface. The top portion 22 includes a surface 28, which may be provided with adhesive material 30 to help prevent the equipment 24 from slipping.

Figure 5:
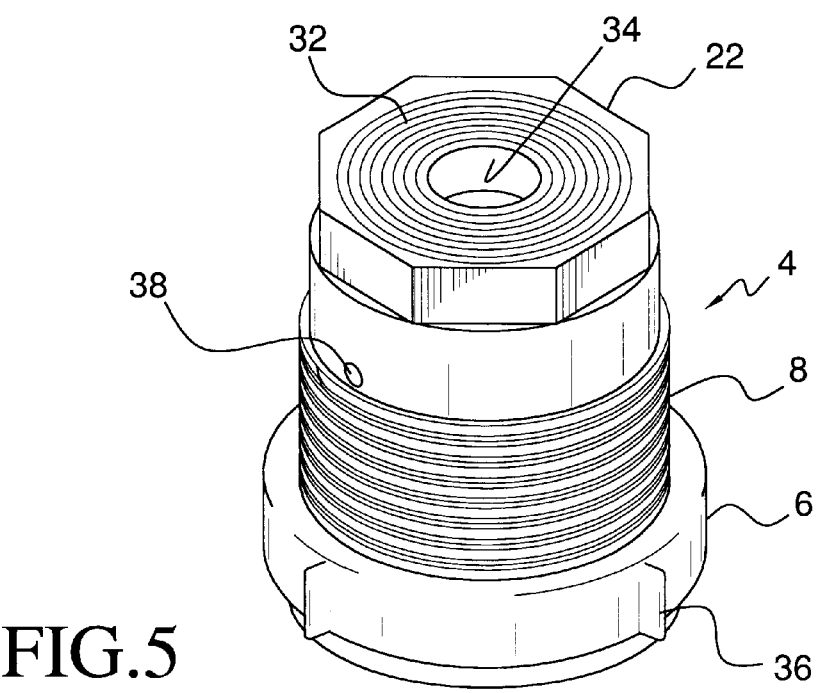
FIG. 5 is a perspective of another embodiment of a component of the invention.
Figure 6:
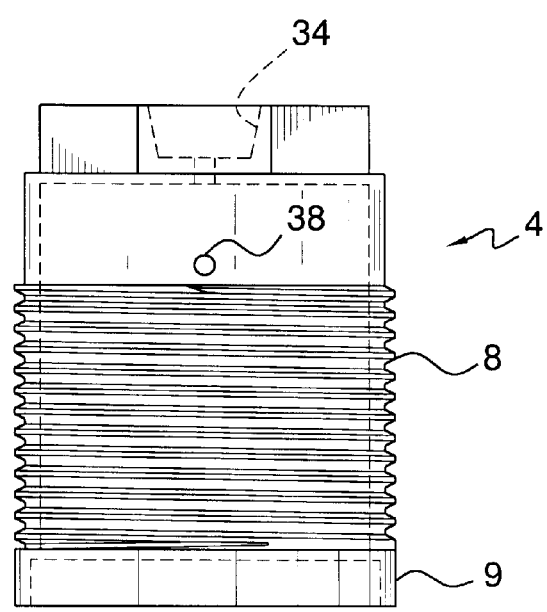
FIG. 6 is a side elevational view of FIG. 5, with the nut omitted.

Referring to FIGS. 5 and 6, another embodiment of the body 4 is disclosed. The top portion 22 is provided with circular grooves 32 and a central cavity 34. The grooves 32 advantageously provide increased gripping engagement with the equipment 24. The cavity 34 may be used to receive the support feet that are typically provided with the equipment 24.

The nut 6, instead of being octagonal in shape, may be provided with gripping lugs 36 to assist in turning the nut 6 when adjusting the height of the body 4.

Figure 4:
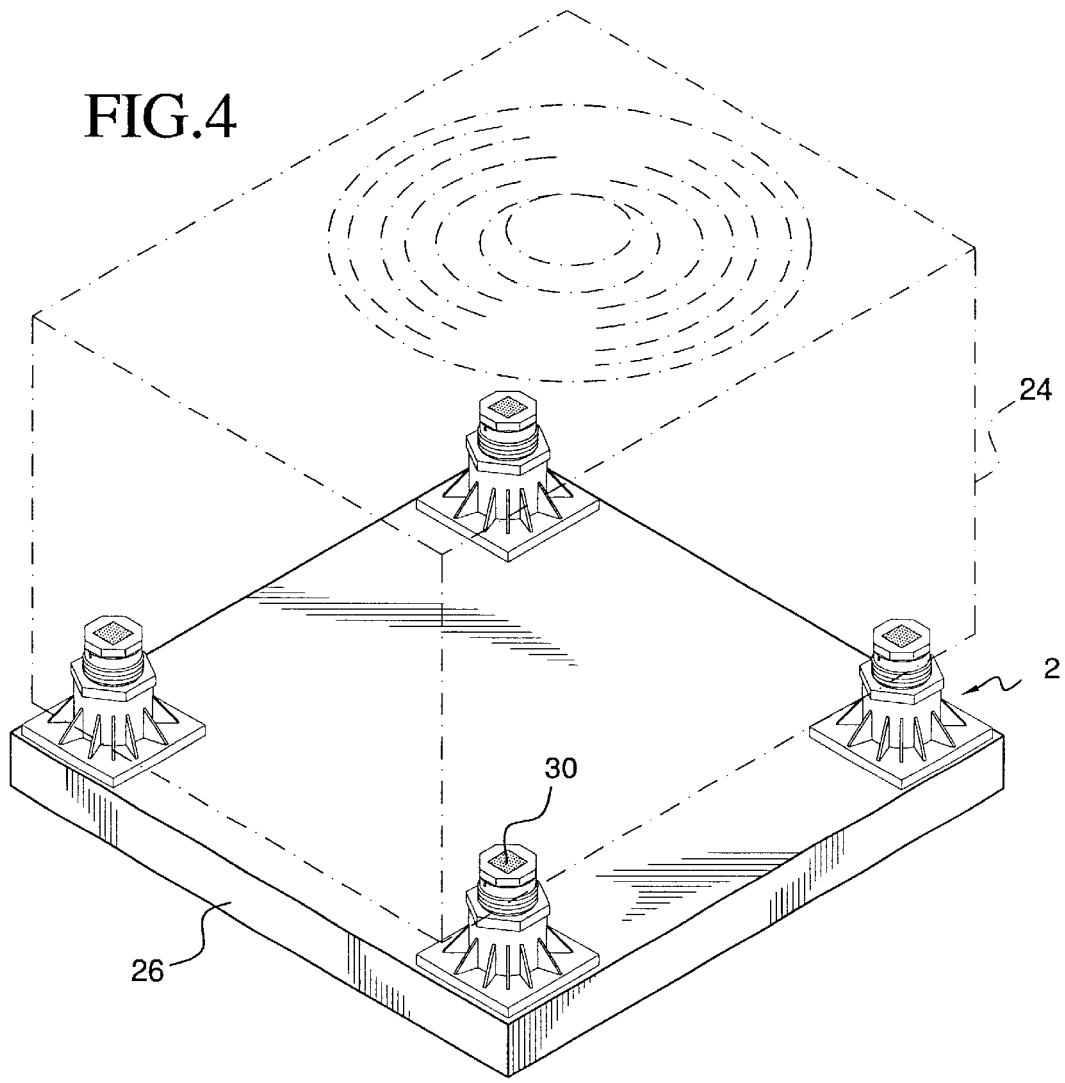
FIG. 4 is a perspective view of a plurality of base support mounts of FIG. 1 used to support an equipment.

In use, a plurality of the mounts R are used to support the equipment 24, as best shown in FIG. 4. The nut 6 is turned clockwise or counterclockwise to adjust the height of the body 4 as desired. Typically, the pad 26 would be initially level so that the height of each mount R would be substantially the same to provide a level installation for the equipment 24. However, in a situation where the pad 26 is not level initially, or where the pad 26 shifts and inclines, the height of each mount R may be adjusted independently by turning the appropriate screws 6 in the proper direction to level the equipment 24. Once the mounts R are properly adjusted, the set screw 20 locks the body 4 at the adjusted height.

The body 4 may also include a hole 38 for providing means for equalizing the air pressure within the body 4 with the outside when the body 4 is being raised or lowered.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. Base support mount for a HVAC equipment, comprising:
   a) a base including a cavity having an outer edge;
   b) a body received within said cavity, said body including outside threads, said body including a portion to support the equipment in a spaced relationship from a horizontal surface, said body being vertically slidably movable within said cavity; and c) a nut engaging said outside threads and said outer edge, said nut being effective to slidably raise or lower said body relative to said base when said nut is turned clockwise or counterclockwise, respectively; and d) a setscrew to lock said body relative to said base; wherein said body includes a top surface; and said surface includes adhesive.

2. A mount as in claim 1, wherein said base includes a sleeve portion and a flange portion.

3. A mount as in claim 1, wherein said cavity has a cylindrical surface.

4. A mount as in claim 2, wherein said base includes a plurality of gussets joined to said flange portion and said sleeve portion.

5. A mount as in claim 1, wherein said set screw is carried by said base.

6. A mount as in claim 1, wherein said nut is octagonal.

7. A mount as in claim 1, wherein said nut includes lugs.

8. A mount as in claim 1, wherein:

a) said body includes a cylindrical portion disposed within said cavity; and b) said threads are disposed on said cylindrical portion.

9. A mount as in claim 1, wherein said body includes an octagonal portion.

10. A mount as in claim 1, wherein:

a) said body is hollow; and b) said body includes an opening to vent the interior of said body.

11. A mount as in claim 1, wherein said top surface has a plurality of grooves.

12. A mount as in claim 11, wherein said grooves are concentric circles.

13. A mount as in claim 1, wherein:

said top surface includes a cavity.

14. A system for supporting an equipment above an uneven surface, comprising:

a) a plurality of height adjustable mounts to support the equipment above the surface;

b) each of said mounts includes a base;

c) said base including a cavity having an outer periphery;

d) a body received within said cavity, said body including outside threads, said body including a portion to engage the equipment, said body being vertically slidably movable within said cavity; and e) a nut engaging said outside threads and said outer periphery, said nut being effective to slidably raise or lower said body portion relative to said base when said nut is turned clockwise or counterclockwise, respectively, thereby leveling each respective body portion relative to each other; and f) a setscrew to lock said body relative to said base; wherein said body includes a top surface; and said surface includes adhesive.

15. Base support mount for a HVAC equipment, comprising:

a) a base including a cavity having an outer edge;

b) a body received within said cavity, said body including outside threads, said body including a portion to support the equipment in a spaced relationship from a horizontal surface, said body being vertically slidably movable within said cavity;

c) a nut engaging said outside threads and said outer edge, said nut being effective to slidably raise or lower said body relative to said base when said nut is turned clockwise or counterclockwise, respectively; and d) said body including an unthreaded bottom portion to prevent said nut from unscrewing from said body at said bottom portion.

16. Base support mount for a HVAC equipment, comprising:

a) a base including a cavity having an outer edge;

b) a body received within said cavity, said body including outside threads, said body including a portion to support the equipment in a spaced relationship from a horizontal surface, said body being vertically slidably movable within said cavity;

c) a nut engaging said outside threads and said outer edge, said nut being effective to slidably raise or lower said body relative to said base when said nut is turned clockwise or counterclockwise, respectively;

d) a setscrew to lock said body relative to said base; and e) said body is hollow and including an opening to vent the interior of said body.

* * * * *